Jan. 2, 1962   F. RYDER ET AL   3,015,233
MASS FLOWMETER
Filed July 22, 1958   3 Sheets-Sheet 1

INVENTORS
BERNARD FISHMAN
FREDERICK RYDER
BY
Kenyon & Kenyon
ATTORNEYS

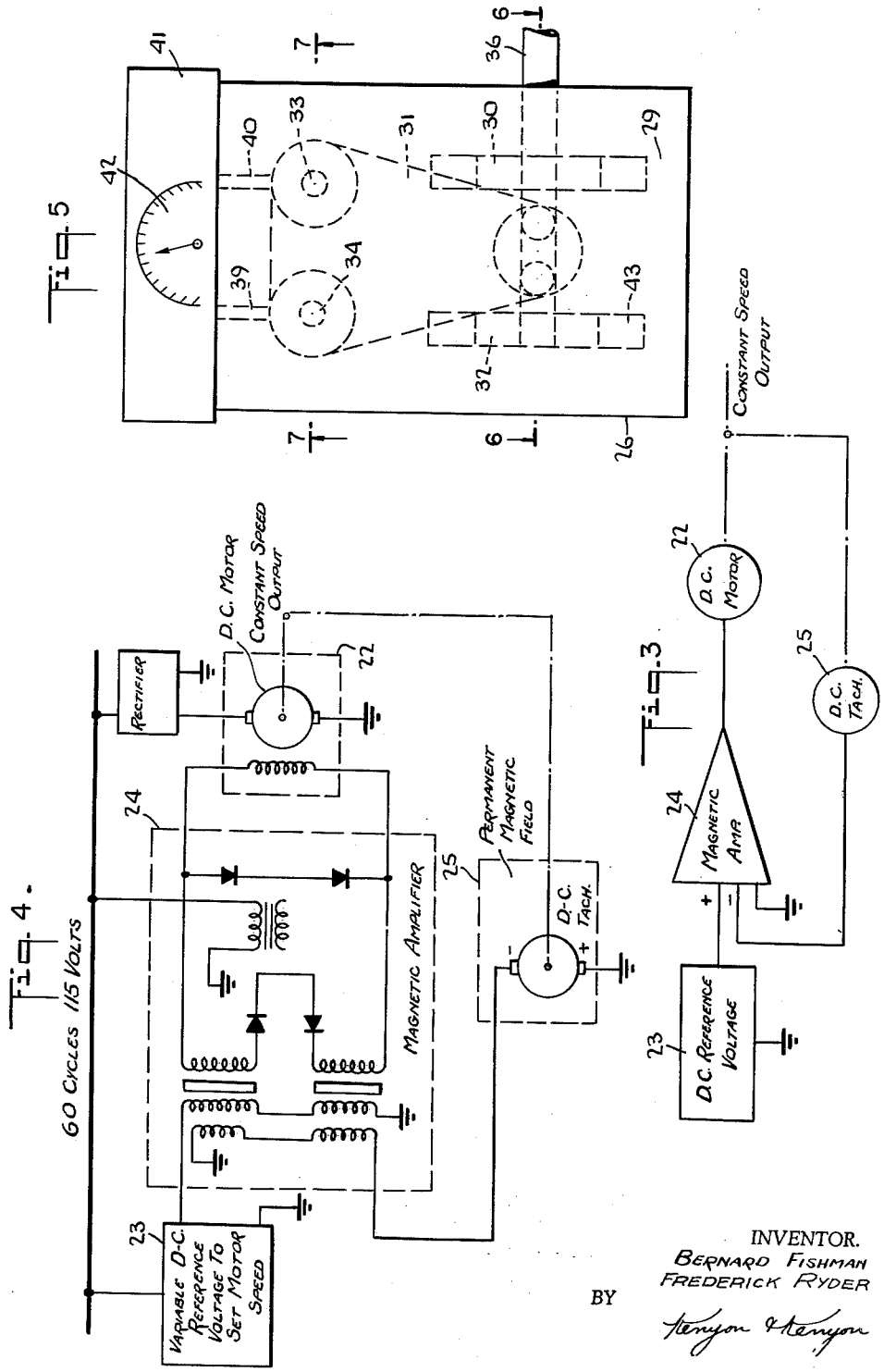

Jan. 2, 1962   F. RYDER ET AL   3,015,233
MASS FLOWMETER
Filed July 22, 1958   3 Sheets-Sheet 3
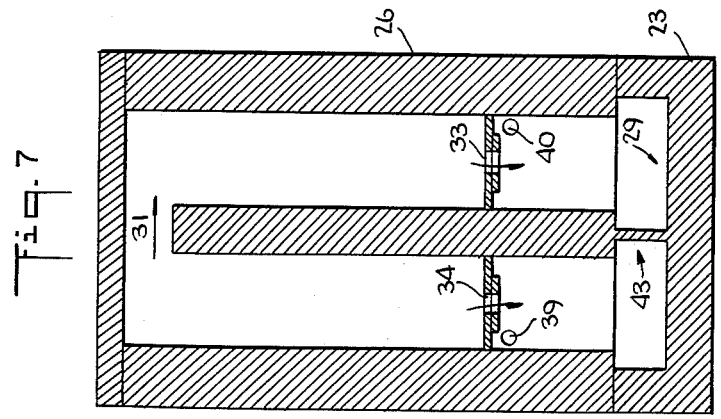
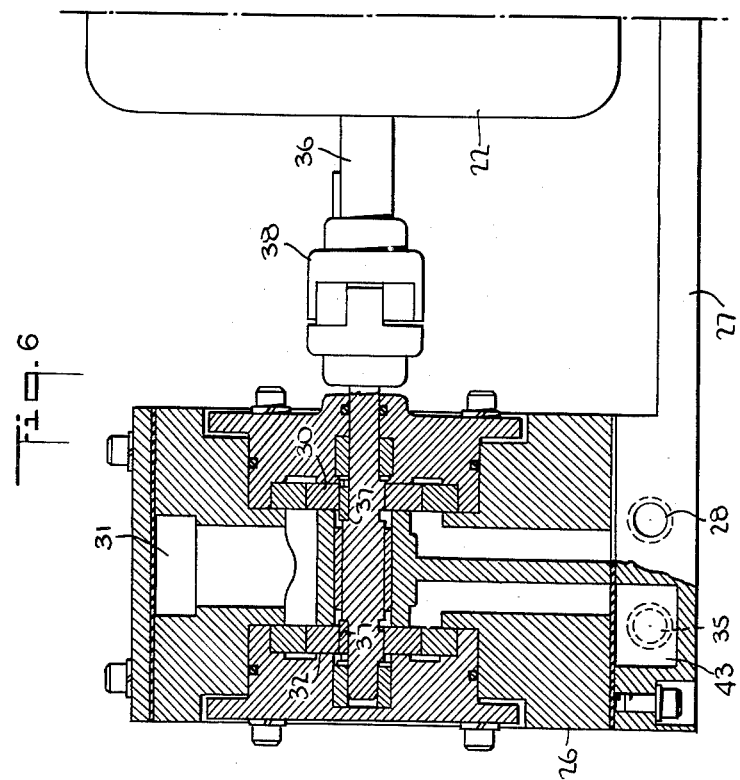
INVENTORS
BERNARD FISHMAN
FREDERICK RYDER
BY Kenyon & Kenyon
ATTORNEYS

United States Patent Office 3,015,233
Patented Jan. 2, 1962

3,015,233
MASS FLOWMETER
Frederick Ryder, Lynbrook, and Bernard Fishman, New York, N.Y., assignors to Simmonds Aerocessories, Inc., Tarrytown, N.Y., a corporation of New York
Filed July 22, 1958, Ser. No. 750,220
4 Claims. (Cl. 73—205)

This invention relates to apparatus adapted to measure rate of flow of fluids and more particularly relates to flowmeters adapted to measure mass flow rate in a linear manner.

Flowmeters adapted to measure the rate of flow through a conduit can usually be classified into one of three types, namely, volumetric, differential pressure, and mass-rate.

In the volumetric flowmeter the flow of liquid causes a propeller or turbine to revolve with an angular velocity proportional to the volume of fluid passing through it. In other embodiments the flow causes rotation of a nutating disc, rotation of an oscillating piston, or reciprocation of plungers. Such volumetric flowmeters require a converter to give actual flow rate. In order to read out mass flow rate, it is necessary that a signal proportional to the density of the fluid be combined with the flowmeter readings.

Differential pressure flowmeters measure flow rate by sensing the differential pressure across an orifice or in a venturi, flow nozzle, Pitot tube, or other such device. The velocity head or kinetic energy due to the fluid velocity is measured in this type of meter. Since there is a known relationship between velocity head and fluid velocity for each specific meter, the fluid velocity can be determined by the following formula:

$$V = C\sqrt{2g\frac{\Delta P}{S}}$$

Where:
$V$ = Velocity of fluid
$C$ = Metering element coefficient
$g$ = Gravity constant
$\Delta P$ = Differential pressure
$S$ = Density of fluid Mass flow rate is equal to:

$$W = SAV = CA\sqrt{2gS\Delta P}$$

where:
$W$ = mass flow rate
$A$ = area of the metering element cross section.

Therefore, using known differential pressure flowmeters to obtain mass flow rate measurements also requires measurement of density and extraction of the square root of the read-out. Further, the differential pressure output signal by itself has a non-linear relationship to the flow rate and cannot be related to either the mass or volumetric flow rate except by including a fluid density factor.

Both the volumetric and differential pressure flowmeters have the additional fault that they will not accurately measure flow rate when the flow is pulsating or during transients. In the measurement of pulsating or transient flows, the accuracy of the volumetric type flowmeter is limited by the poor response characteristics of the known sensing elements. The differential pressure type flowmeter will introduce errors in measuring transient or pulsating flows due to the non-linear flow to read-out relationship.

There are two basic types of mass rate flowmeters, namely, angular momentum and recirculating type meters. In the former, angular momentum is imparted to the flowing fluid by means of a constant speed driving motor and the read-out signal is obtained as a torque. This type of mass rate flowmeter is expensive and tends to require a great deal of maintenance.

In the recirculation type of mass rate flowmeter, recirculation pumps or other such devices are used to obtain a recirculation of a constant volumetric flow in the meter. The meter is essentially a differential pressure type meter in which a constant volumetric flow is added or subtracted from the fluid flow being measured. The subject invention is an improved flowmeter of this type.

It is an object of this invention to provide a flowmeter which uses a single differential pressure indicator or transducer to obtain a linear indication of mass flow rate of fluids having different densities.

It is another object of this invention to provide such a flowmeter which uses a single differential pressure indicator transducer for sensing differential pressure across two orifices.

It is another object of this invention to provide such a flowmeter which accurately measures transient or pulsating flow as well as steady flow.

It is another object of this invention to provide such a flowmeter which is inexpensive, simply constructed and requires a minimum of maintenance.

Other objects and a fuller understanding of the invention may be had by referring to the following description and claims taken in conjunction with the accompanying drawings in which:

FIGURE 3 is a schematic diagram of a constant speed motor regulator;

FIGURE 4 is a schematic diagram showing the electrical circuitry of one type of constant speed motor regulator in more detail;

FIGURE 5 is a top view of a specific embodiment of the flowmeter of the present invention;

FIGURE 6 is a cross-sectional view taken on line 6—6 on FIGURE 5; and

FIGURE 7 is a cross-sectional view taken on line 7—7 on FIGURE 5.

Figure 1:
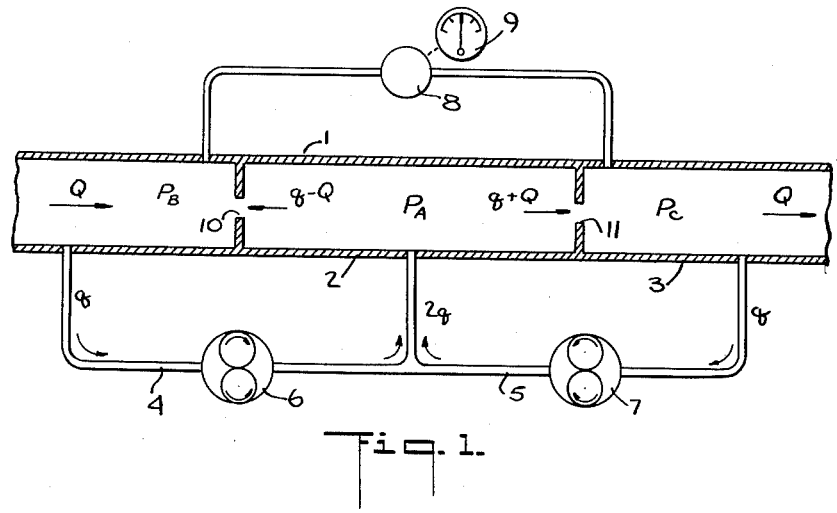
FIGURE 1 is a schematic drawing of a flowmeter of the present invention utilizing two orifices, two recirculating pumps and a single differential pressure indicator or transducer.

FIGURE 1, shows a schematic drawing of a conduit 1 through which variable input and output volumetric flow "$Q$" is directed. The conduit 1 has two sections 2 and 3 spaced therealong. Section 2 contains an orifice 10 of Area $A_{10}$ and section 3 contains an orifice 11 of area $A_{11}$, each of the orifices 10, 11 are spaced along the path of the flow in the conduit 1 within sections 2, 3, respectively. Both areas $A_{10}$ and $A_{11}$ are of like size and configuration. Sections 2 and 3 are bridged by branch conduits 4 and 5 respectively which each have a recirculating pump 6, 7 disposed intermediate the ends thereof. These pumps 6, 7 are necessarily capable of pumping a like volume of flow "$q$." As shown in FIGURE 1, this flow "$q$" is larger than the input flow "$Q$." In one instance, input flow "$Q$" is subtracted from the flow "$q$" adjacent the input end of section 2; and is added intermediate sections 2 and 3 by means of branch conduit 4 and pump 6 whereas a like "$q$" is subtracted from the output of section 3 and recirculated via branch conduit 5 and pump 7 to a point intermediate sections 2 and 3. Thus, as shown, the flow through section 2 is "$q-Q$" whereas the flow through section 3 is "$q+Q$." It has been found that by connecting a meter adapted to measure the differential pressure across these sections 2 and 3 and orifices 10 and 11, such as a differential pressure transducer 8, a reading can be obtained which linearly closely approximates the mass flow rate through the conduit 1.

As stated earlier, the flow rate for an orifice is $$(1) \qquad Q_v = CA\sqrt{\frac{2g\Delta P}{S}}$$

Where $Q_v$ = volumetric flowrate
$C$ = orifice coefficient
$A$ = area of the orifice
$\Delta P$ = pressure drop across the orifice
$S$ = density of the fluid
$g$ = gravity constant The expression for the flow rate through orifices 10 and 11 of FIGURE 1 will then be:

$$(2) \qquad q - Q = C_{10}A_{10}\sqrt{\frac{2g\Delta P_{10}}{S}}$$

$$(3) \qquad q + Q = C_{11}A_{11}\sqrt{\frac{2g\Delta P_{11}}{S}}$$

By squaring and subtracting:

$$(4) \qquad 4qQ = C_{11}^2 A_{11}^2 \left[\frac{2g\Delta P_{11}}{S}\right] - C_{10}^2 A_{10}^2 \left[\frac{2g\Delta P_{10}}{S}\right]$$

and if $C_{11} = C_{10} = C$ and $A_{11} = A_{10} = A$, then we can write Equation (4) as:

$$(5) \qquad 4qQ = \frac{2gC^2A^2}{S}[\Delta P_{11} - \Delta P_{10}]$$

Further:

$$(6) \qquad \Delta P_{11} - \Delta P_{10} = \frac{2SQq}{gC^2A^2} = \frac{2q}{gC^2A^2}SQ$$

If we let:

$$(7) \qquad \frac{2q}{gC^2A^2} = K \text{ (constant)}$$

and since:

$$(8) \qquad W = SQ \text{ where } W = \text{mass flow rate}$$

then:

$$(9) \qquad \Delta P_{11} - \Delta P_{10} = KW$$

Now if the pressure in the conduit between the orifices 10, 11 is designated $P_A$, the pressure on the conduit input side of orifice 10 is designated $P_B$ and the pressure on the conduit output side of orifice 11 is designated $P_C$ then:

$$(10) \qquad \Delta P_{11} - \Delta P_{10} = (P_A - P_C) - (P_A - P_B) = P_B - P_C$$

therefore:

$$(11) \qquad P_B - P_C = KW = \Delta P$$

where:

$\Delta P$ = pressure drop across flowmeter as shown in FIGURE 1.

Hence, the difference between the differential pressures between sections 2 and 3 will be directly proportional to the mass flow rate. The transducer's indicator 9 will then read out mass flow rate. It should be noted that the directions of recirculation flows "$q$" could be reversed, as shown in FIGURE 2, with the result that the greater pressure drop would occur across orifice 10 rather than orifice 11, but the final mass flow versus indicated differential pressure relationship would be the same as shown in Equation (10), as can be seen below:

$$(12) \qquad \Delta P_{10} - \Delta P_{11} = (P_B - P_A) - (P_C - P_A) = P_B - P_C$$

Figure 2:
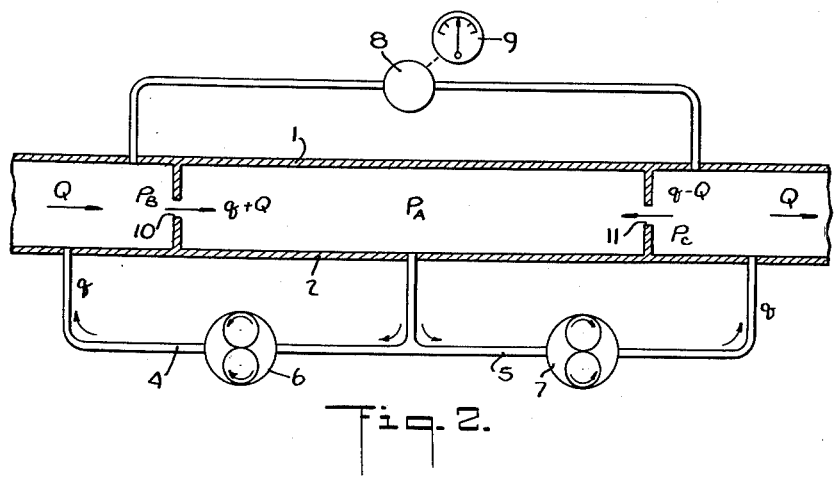
FIGURE 2 is a schematic drawing similar to FIGURE 1 illustrating another manner of recirculating flow.

The invention depicted in FIGURES 1 and 2 is highly advantageous, because only one differential pressure sensor is required and the total pressure drop across the meter is a direct measure of mass flow rate, and also because the measured flow can be reduced to zero without causing any significant variation in orifice discharge coefficient, thus permitting accurate flow measurement over the full range from zero to maximum flow rate.

It will be recognized that in the foregoing description of the invention the pumps used must function at a constant speed so that "$q$" will be constant. In FIGURES 3 and 4 known systems for accomplishing such constant speeding of the pump motors are shown diagrammatically. The block diagram of FIGURE 3 shows a direct current pump motor 22 which is regulated for constant speed by means of a tachometer generator 25 whose output voltage is a function of speed. The output signal from the tachometer generator is then compared with a constant reference voltage 23, and the magnetic amplifier 24 then acts to control the field current of the D.C. motor to maintain constant speed. An example of this constant speed regulating system is shown in more detail in FIGURE 4 and it is believed that no further explanation is necessary other than to suggest that this is a known system.

It should also be recognized that instead of using constant speed motors each of the above embodiments can be operated by keeping the $\Delta P$ or pressure differential constant by regulating the speed of the pump and thus varying "$q$" to accomplish this objective. This can be done by choosing a reference $\Delta P$ and using variable speed pump motors which are controlled by means of known servo mechanisms interconnecting them with the $\Delta P$ sensor whereby the mass flow rate is measured linearly as being inversely proportional to the pump speeds. All of the above formulas can be readily modified to show this relationship. Embodiments of this invention so modified have the advantage that increased accuracy of flow measurement can be obtained in the low flow regions.

FIGURES 5–7 illustrate an example of a flowmeter construction in accordance with the present invention, and in particular the flowmeter illustrated in FIGURE 1. In these figures the main housing 26 of the flowmeter and pump motor 22 are supported by bed plate 27. The input flow enters through the inlet port 28 and in the inlet conduit or chamber 29 combines with the fluid passing through the orifice 33. The combined flow is then pumped by pumping element 30 into the orifice chamber 31 where it combines with the flow coming from pumping element 32. Part of the fluid leaves the orifice chamber 31 through said orifice 33 and passes into the inlet chamber 29 where it combines with the fluid entering the flowmeter through inlet port 28. The balance of the fluid leaves the orifice chamber 31 through orifice 34 and passes into the outlet chamber 43. Part of the fluid is pumped from the outlet chamber 43 by means of pumping element 32 and then passes into the orifice chamber 31 where it combines with the fluid coming from pumping element 30. The balance of the fluid entering the outlet chamber 43 from orifice 34 leaves through the outlet port 35. Pumps 30 and 32 are of the positive displacement internal gear type, capable of insuring the same output per revolution under all conditions, but any other type of positive displacement pump can be used. Shaft 36 is attached to these pumps by keys 37 and is driven by motor 22 through flexible coupling 38.

Ducts 39 and 40 lead to a $\Delta P$ sensor or transducer 41 which can be of any standard type. The transducer 41 mechanically actuates the pointer of indicator 42 and the scale thereon is calibrated in lb./hr., though the transducer used may develop an electrical or pneumatic analog of the $\Delta P$ for other purposes, e.g., telemetering the indication to a distant point.

Although we have described our invention with a certain degree of particularity, it is understood that the present disclosure has been made only by way of example and that numerous changes in the details of construction and the combination and arrangements of parts may be resorted to without departing from the spirit and scope of the invention as hereinafter claimed.

We claim:

1. A mass flowmeter adapted to measure the mass flow rate of liquid passing therethrough comprising a conduit having two orifices with like cross-sectional areas smaller than the cross-sectional area of said conduit in series, means for recirculating constant volumetric flow through the first orifice so that this recirculating flow is additive to the input flow being measured, and means for recirculating a like constant volumetric flow through the second orifice so that this recirculating flow is subtractive from the input flow being measured, each of these recirculating flows to be larger than the input flow being measured and means for measuring the pressure differential across the said orifices.

2. A mass flowmeter adapted to measure the mass flow rate of liquid passing therethrough comprising a conduit having two orifices with like cross-sectional areas smaller than the cross-sectional area of said conduit in series, means for recirculating constant volumetric flow through the first orifice so that this recirculating flow is subtractive from the input flow being measured, and means for recirculating a like constant volumetric flow through the second orifice so that this recirculating flow is additive to the input flow being measured, each of these recirculating flows to be larger than the input flow being measured and means for measuring the pressure differential across the said orifices.

3. A mass flowmeter adapted to measure the mass flow rate of liquid passing therethrough comprising a conduit having two orifices with like cross-sectional areas smaller than the cross-sectional area of said conduit in series, means for recirculating constant volumetric flow through the first orifice so that this recirculating flow is additive to the input flow being measured, and means for recirculating a like constant volumetric flow through the second orifice so that this recirculating flow is subtractive from the input flow being measured, each of these recirculating flows to be larger than the input flow being measured and means for measuring the pressure differential from immediately upstream of the first orifice to immediately downstream of the second orifice.

4. A mass flowmeter adapted to measure the mass flow rate of liquid passing therethrough comprising a conduit having two orifices with like cross-sectional areas smaller than the cross-sectional area of said conduit in series, means for recirculating constant volumetric flow through the first orifice so that this recirculating flow is subtractive from the input flow being measured, and means for recirculating a like constant volumetric flow through the second orifice so that this recirculating flow is additive to the input flow being measured, each of these recirculating flows to be larger than the input flow being measured and means for measuring the pressure differential from immediately upstream of the first orifice to immediately downstream of the second orifice.

References Cited in the file of this patent

UNITED STATES PATENTS

| | | |
|---|---|---|
| 1,518,279 | Smoot | Dec. 9, 1924 |
| 1,559,156 | Bullock | Oct. 27, 1925 |
| 2,041,863 | Rhodes | May 26, 1936 |
| 2,286,411 | Hazard | June 16, 1942 |
| 2,531,620 | Grise | Nov. 28, 1950 |
| 2,570,410 | Vetter | Oct. 9, 1951 |

FOREIGN PATENTS

| | | |
|---|---|---|
| 639,135 | Great Britain | June 21, 1950 |
| 844,508 | Germany | July 21, 1952 |
| 711,109 | Great Britain | June 23, 1954 |